(No Model.)
A. MORAND.
PROCESS OF AND APPARATUS FOR CLARIFYING EXTRACTS.
No. 365,087. Patented June 21, 1887.
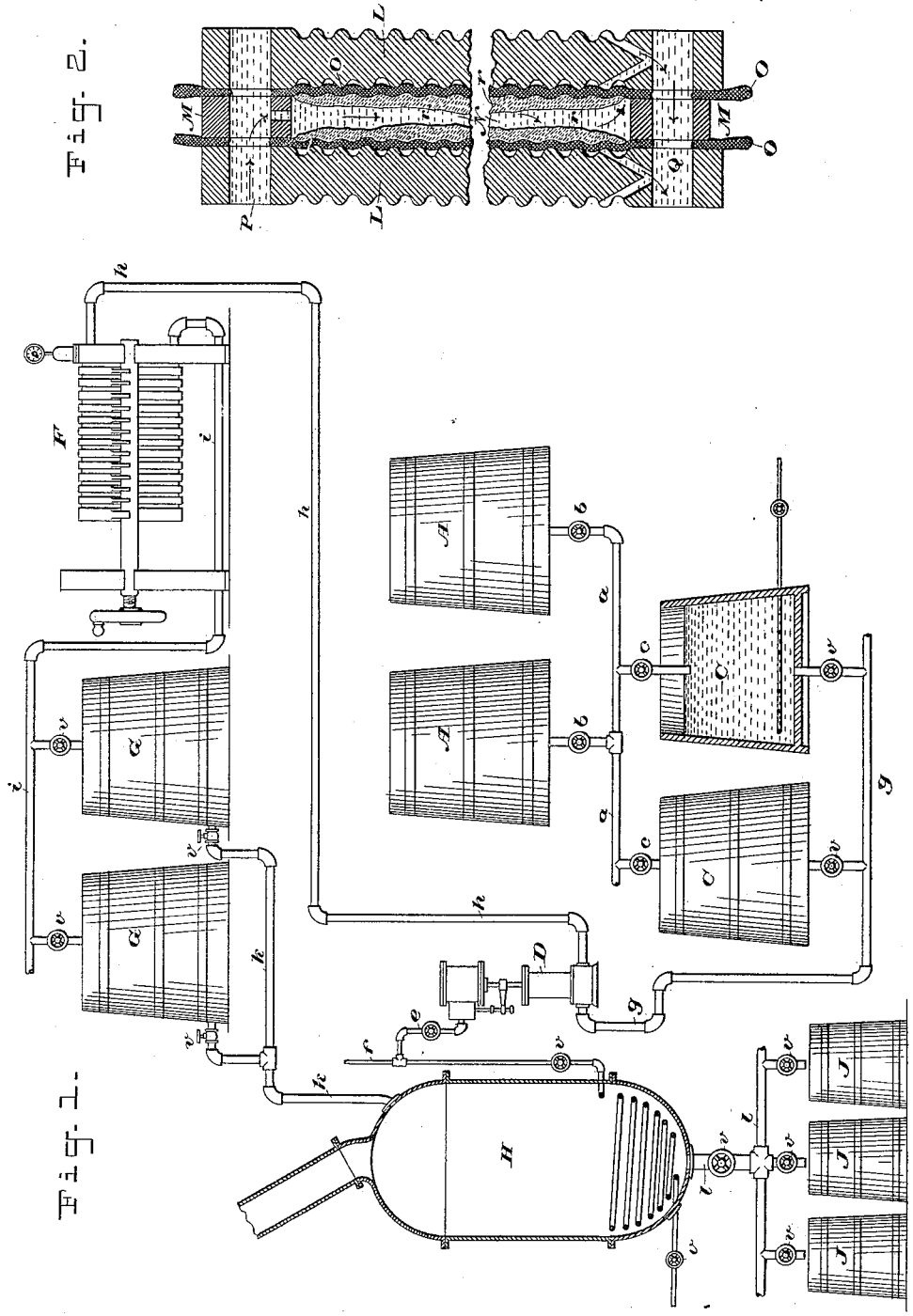
WITNESSES:
Geo. H. Fraser.
Arthur H. Browne
INVENTOR:
Augustus Morand,
By his Attorneys,
Burke, Fraser & Bennett

UNITED STATES PATENT OFFICE.

AUGUSTUS MORAND, OF PHILADELPHIA, PENNSYLVANIA.

PROCESS OF AND APPARATUS FOR CLARIFYING EXTRACTS.

SPECIFICATION forming part of Letters Patent No. 365,087, dated June 21, 1887.

Application filed February 25, 1886. Serial No. 193,249. (No model.) Patented in France March 23, 1886, No, 162,288; in Belgium March 31, 1886, No. 23,550, and in Italy June 30, 1886, XX, 20,016, and XXXIX, 390.

*To all whom it may concern:*

Be it known that I, AUGUSTUS MORAND, a citizen of the United States, residing at Germantown, in the city of Philadelphia and State of Pennsylvania, have invented certain new and useful Improvements in Methods and Apparatus for Purifying and Decolorizing Tannin Extract, of which the following is a specification.

I have received Letters Patent for this invention in the following foreign countries: France, No. 162,288, March 23, 1886; Belgium, No. 23,550, March 31, 1886, and Italy, June 30, 1886, "Registro Generale," Vol. XX, No. 20,016, and "Registro Attestati," Vol. XXXIX, No. 390.

This invention is designed to effect an improvement in the methods of refining or purifying tannin extract.

Heretofore tannin extract has been clarified by means of either gelatine or the albumen of blood. The use of gelatine is wasteful, because of the consumption of tannin. Clarification with blood is also objectionable in several respects.

In practicing the blood process it has been customary to take the acidulous extract as it drawn off from the macerating-tanks and neutralize it by adding an alkali, then to stir in a quantity of blood, then to raise the temperature to the coagulating point of albumen, then to suffer the coagulated blood to precipitate, to decant the clear extract, and, finally, to filter it through a cask of shavings, to free it from any remaining particles of coagulated blood.

My patent for "improvements in the art of clarifying tannin extract," granted March 23, 1886, No. 338,431, describes the clarification by means, preferably, of an alkaline solution of caseine, so that the extract is neutralized and clarified at the same operation, the clarification being very thorough and rapid. With either the blood process of clarifying or the improved process embodied in my said application, delay and difficulty are experienced in separating the clarifying substance from the clarified extract, unless the latter be of very slight density. The precipitation of the clarifying agent is not readily effected unless the extract be of less density than 2° Baumé. It is possible, however, to produce the extract at a much greater density, even to 6° or over, and this has the important advantage of effecting a considerable economy in the subsequent concentration of the extract.

My present invention aims to not only provide a means for more thoroughly refining and decolorizing the extract, but also to provide for the purification of the extract at the greatest density at which it can be obtained.

My invention consists in mingling with the extract a suitable purifying, clarifying, or decolorizing substance, which is disseminated in a finely-divided condition through the extract, and in then forcing the extract, with this purifying substance held in suspension in it, through a dense textile filtering medium, which arrests the purifying substance, whereby the extract is not only purified or clarified, but is freed from the clarifying agent and filtered through the same at one operation.

Figure 1 of the accompanying drawings is an elevation of the apparatus necessary for the practice of my invention. Fig. 2 is an enlarged fragmentary cross section of part of the apparatus.

Let A A designate the extracting vessels or tanks, of which there may be any number. From the bottoms of these tanks a pipe, $a$, leads to one, two, or more clarifying-tanks, C C. Valves $b$ $b$ control the flow of liquid from the tanks A into the pipe $a$, and valves $c$ $c$ control its flow from the pipe $a$ into one or other of the tanks C.

D is a powerful steam force-pump, receiving steam from the pipe $e$. A pipe, $g$, leads from each tank C to the pump D, and a pipe, $h$, leads from the pump to a hydraulic filter-press, F. This press is constructed in much the same way as the hydraulic filter-presses (so-called) heretofore made, the filtration being effected by forcing the material through a heavy woven fabric supported upon corrugated or grooved surfaces in a series of chambers. These chambers are formed by a series of flanged plates with the pieces of fabric between them, all being pressed together and made tight by means of a screw. The liquid is forced into all these chambers, passes through the dense material of the filtering fabric, and flows off through the corrugations to the outlet.

G G are the receiving-tanks for the filtered extract. A pipe, $i$, connects with the outlet of the filter-press and leads to these tanks.

H is an evaporator or vacuum-pan of usual construction, and having substantially the proportions shown. A pipe, $k$, leads from both tanks G G to this vacuum-pan, and a steam-pipe, $f$, leads from the pipe S and connects with the coil or worm in the vacuum-pan. From the vacuum-pan a pipe, $l$, extends to a series of storage-tanks, J J, into which the purified and concentrated extract is delivered. It is from these tanks that the extract is drawn off into barrels as required. Valves or cocks $v$ $v$ are provided in the various pipes, as shown.

In the use of my invention the first step in the process of manufacture—the extraction of the tannin—may be conducted according to either of the three methods heretofore known— namely, by percolation, by maceration, or by digestion. If the percolation method is adopted, a series of tanks or deep vessels will be provided, preferably of wood, each having a slatted or perforated false bottom elevated somewhat above its real bottom. The wood, bark, or other substance will be reduced to small chips or fragments by cutting or grinding, and will be placed in the tanks, and water, either hot or cold, will be poured or sprinkled on the top of the mass, and will slowly percolate down through it, gradually dissolving the tannin, and collecting in the space beneath the false bottom, from which it will be drawn off and caused to pass again through the tank or through other tanks in succession. The best practice in this percolating or "leaching" process is to arrange a battery of tanks and pass the liquid through them successively, passing the fresh water first through a tank containing nearly spent material, then through others containing successively richer materials, and finally through a tank newly filled with the fresh material. At each percolation the liquid becomes more richly charged with tannin and other soluble matters, and it finally acquires a considerable density—say, 4° to 6° Baumé. If the maceration process be preferred, a similar series of tanks will be provided, except that false bottoms are not necessary, and pipes will lead from a steam-boiler to the several tanks. After the comminuted vegetable matter is placed in a tank it is filled with water, to which certain chemicals have sometimes been added. Steam is then turned on and the mass is boiled for an hour or more. The water or solution is then drawn off and passed again through this tank or some other of the series, and this operation is repeated until practically all of the tannin is dissolved, which requires about twelve hours. If the digestion process be adopted, one or more digesters or strong closed vessels must be provided, capable of withstanding a heavy internal pressure. A vertical cylinder with removable top and bottom is most suitable. The digesters should be made of iron or steel and lined with copper or gun-metal or with wood. The bottom of the digester is closed, and the wood or bark is placed in the vessel through the open top, hot water being simultaneously introduced. The top of the vessel is then closed and steam is turned on. The steam raises the water to a high temperature, and the steam and water permeate to all portions of the mass and soften the latter, dissolving out the soluble matters contained in the cells of the wood, which are taken up and held in solution by the water. When the extraction is completed, the extract is blown off and is delivered into the clarifying-tank. Each of these processes is well understood, and all have, as I believe, been practiced to greater or less extent. The extract having been produced by either of these methods and delivered in the clarifying-tank C, I proceed according to my present invention, as follows: I first stir into the extract a clarifying and decolorizing substance or color-absorbent, which should be of nearly the same specific gravity as the extract, so that it will remain suspended therein. I prefer the use of caseine in accordance with my said previous patent; but my present invention is not confined to such use. When the extract is acidulous, an alkaline solution of caseine is prepared, as described in my said patent, and enough of it is stirred into the extract to neutralize, or very nearly so, the free acid therein. The alkaline solvent of the caseine unites with the free acid (sulphuric acid) in the extract, thus setting the caseine free in a minutely-flocculent condition, pervading every portion of the extract. The minute particles of caseine absorb or attach to themselves the foreign matters or impurities in the extract, and are also absorbent of coloring-matter which it contains. The extract, with the caseine in suspension, is then forced under heavy pressure by the pump D through the dense filtering-cloths in the filter-press F. The filter-cloth arrests the particles of caseine, but permits the clear extract to be forced through. The arrested caseine thus forms a cake or layer over the cloth, and the remainder of the extract is forced to pass through this layer of caseine and then through the cloth, whereby every particle of extract is brought into contact with the caseine, so that the effect of the latter as a color-absorbent and purifying agent is utilized to the utmost. The extract as it comes from the filter is found to be beautifully clear and of a much lighter color, the resinous and other matters, which gave it its dark color, having been almost or quite separated by the double clarifying and filtering process to which it has been subjected.

Fig. 2 will make the action of the filter-press clear. This view shows two of the plates and the intervening chamber on an enlarged scale. L L are the filtering-plates, having smooth rims or margins and corrugated or grooved surfaces inside of these margins. M is the separating-ring, coming between the plates L L, to form the chamber N. O O are the filter-cloths resting against the corrugated surfaces, P is the inlet-passage for the extract, and Q is the outlet-passage for the filtered extract. The layers r r show the cakes of caseine formed on the filtering-cloths, through which cakes and the cloths the liquid is forced to pass.

The filtration of the extract is best effected while it is somewhat hot. In general the hotter the extract is made the more easily and rapidly will it filter, and the more perfect will be the result of the filtering process; but, on the contrary, it should not be heated to so high a degree as to impair the quality of the tannin, it being a fact well known to chemists that exposure to excessive heat acts to convert tannic into gallic acid. I find that a temperature of 130° Fahrenheit gives most satisfactory results, and does not impair the tannin. If the extract be made by either the digestion or maceration processes, it will be drawn off hot, and the clarifying and filtering operations may be performed before it cools; but when the extract is made by the percolation process, (which I prefer,) when cold or tepid water is used, it is very desirable to heat the extract before filtering it. The best time to heat it is just after adding the clarifying or decolorizing agent.

For heating the extract, a steam-coil may be placed in the bottom of the tank C, as shown, or steam-passages may be provided in the filter-press, or the pipe g or h may pass through a steam drum or heater, or any other convenient method may be adopted. The filtration may be effected cold or at the normal temperature; but I do not recommend it. The gummy or mucilaginous matters extracted from the wood with the tannin, which would seriously interfere with the filtration of the extract while cold, offer but slight impediment to the hot filtration, and are arrested by the caseine and the filter-cloths, so that the tannin extract is almost wholly freed from them. When the filter-press becomes so clogged with the impurities taken from the crude extract that the passage of the liquid is stopped or greatly impeded, the pumping of liquid into it is suspended, it is unscrewed, and its plates are separated, thereby opening the chambers. A thick coating of caseine and refuse matter is then found adhering to the filter-cloths, and this is removed. It may be sold for fertilizing purposes, and forms a valuable sub-product of the manufacture. The filtered extract is drawn off from the receiving-tanks G, through the pipe k, into the evaporating-pan H, and concentrated *in vacuo* to a density of from 25° to 30° Baumé, after which it is run off into the storage-tanks J J. The concentration of the extract is to render it suitable for transportation and sale; but if the extract is to be used immediately and on the spot, it need not be concentrated, in which case the evaporating-pan may be omitted from the apparatus.

Other purifying or decolorizing substances may be used in place of the alkaline solution of caseine already referred to. Caseine may be used dissolved in an acid solvent, or even in its natural solvent in the form of skimmed milk. The latter, however, is objectionable on account of introducing the whey into the tannin extract. Blood may be used as the purifying substance by stirring it in and coagulating its albumen by heat, or the albumen of blood may be coagulated and then dissolved in an acid or alkali and the solution used as the clarifying agent. Many other clarifying substances may be used in practicing my invention.

My invention has the advantages of purifying the extract more thoroughly and cheaply than heretofore by means that are chiefly mechanical and by a nearly-continuous process, requiring no skilled labor and but little attention from the workman. The removal of the impurities is effected at from twice to three times the density heretofore possible, whereby the cost of concentrating the extract is greatly reduced.

My invention is applicable to sumac extract, dye-wood extracts, and other vegetable extracts analogous to tannin extract.

I claim as my invention—

1. The improvement in the art of manufacturing tannin extract, which consists in purifying and decolorizing the crude extract by mingling with it a purifying agent or color-absorbent, and while this substance is suspended in it pumping it under heavy pressure through a dense filtering fabric, whereby the purifying agent is arrested and forms a layer on the filter-cloth, and the extract is filtered through both this layer and the cloth, substantially as set forth.

2. The improvement in the art of manufacturing tannin extract, which consists in clarifying the crude extract by stirring into it a clarifying agent, heating the extract, and then forcing the hot extract with the clarifying agent suspended in it through a dense filtering-cloth, whereby the clarifying substance is arrested and the extract is filtered through and separated therefrom, substantially as set forth.

3. The improved apparatus for the manufacture of refined commercial tannin extract, which consists of the combination of the extracting-vessel A, the clarifying-tank C, the pressure-pump D, the filter-press F, and the receiving-tank G, with their connecting-pipes, substantially as set forth.

In witness whereof I have hereunto signed my name in the presence of two subscribing witnesses.

AUGS. MORAND.

Witnesses:
ARTHUR C. FRASER,
ELBERT B. BOLTON.